United States Patent
Surgutchik et al.

(10) Patent No.: US 7,849,342 B2
(45) Date of Patent: Dec. 7, 2010

(54) METHOD AND SYSTEM FOR IMPLEMENTING GENERALIZED SYSTEM STUTTER

(75) Inventors: Roman Surgutchik, Santa Clara, CA (US); Robert William Chapman, Mountain View, CA (US); David G. Reed, Saratoga, CA (US); Brad W. Simeral, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 874 days.

(21) Appl. No.: 11/743,099

(22) Filed: May 1, 2007

(65) Prior Publication Data

US 2008/0276108 A1    Nov. 6, 2008

(51) Int. Cl.
  *G06F 1/00* (2006.01)
  *G06F 1/26* (2006.01)
(52) U.S. Cl. ........................ 713/323; 713/320
(58) Field of Classification Search ............ 713/323, 713/320
  See application file for complete search history.

(56) References Cited

U.S. PATENT DOCUMENTS 6,657,634 B1 * 12/2003 Sinclair et al. .......... 345/534
6,971,034 B2   11/2005 Samson et al.
7,155,618 B2 * 12/2006 Moyer et al. .......... 713/320
7,571,335 B2 *  8/2009 Lee ..................... 713/330

FOREIGN PATENT DOCUMENTS

WO    03/077094    9/2003

OTHER PUBLICATIONS

Translated Korean Office Action, KR Pat. App. No. 10-2008-41477, mailed Nov. 26, 2009.
Translated Chinese Office Action, Chinese Pat. App. No. 200810094709.7, dated Jan. 6, 2010.

* cited by examiner

*Primary Examiner*—Chun Cao
(74) *Attorney, Agent, or Firm*—Patterson & Sheridan, LLP

(57) ABSTRACT

A method and system for implementing a generalized system stutter are disclosed. Specifically, one embodiment of the present invention sets forth a method, which includes the steps of blocking a first request received from a first of a plurality of bus masters during a low power state of a computing device for as long as permissible by the timing requirements of the computing device, wherein the first request is capable of triggering the computing device to transition out of the low power state, and during an active state of the computing device, servicing the first request along with other pending requests from the rest of the plurality of bus masters before the computing device transitions back to the low power state.

20 Claims, 8 Drawing Sheets

METHOD AND SYSTEM FOR IMPLEMENTING GENERALIZED SYSTEM STUTTER

BACKGROUND OF THE INVENTION

1. Field of the Invention

Embodiments of the present invention relate generally to power management and more specifically to a method and system for implementing generalized system stutter.

2. Description of the Related Art

Unless otherwise indicated herein, the approaches described in this section are not prior art to the claims in this application and are not admitted to be prior art by inclusion in this section.

Energy efficiency is becoming an increasingly important consideration in many system designs. Memory manufacturers have developed memory systems with multiple power states, such as active, active idle, power-down, and self-refresh. A memory system typically needs to be in the active state to service a request, and the remaining power states are in order of decreasing power consumption but increasing time to transition back to active. In other words, the active state consumes the most power, and the self-refresh state incurs the most delay for clock resynchronization. Similarly, system interconnect links are also associated with multiple power states, with the lowest power state again corresponding to the highest latency. Thus, one approach of achieving energy efficiency is to maintain a memory system, a system interconnect link, or both in the lowest power state for as long as possible, while effectively managing the high latencies associated with entering and exiting such a state.

To illustrate, suppose a display system 110 is the only active agent in a computing device 100 during a low power state, in which system memory 106 is in the self-refresh state, and a system link 108 is in the power-down state. FIG. 1A is a simplified block diagram of a computing device 100 capable of displaying data in this low power state. The display system 110 of the computing device 100 includes a display engine 112, a display device 114, and a display first-in-first-out ("FIFO") buffer 116. The display engine 112 utilizes the display FIFO buffer 116 to decouple the stringent timing requirements of the display device 114 from the memory system 106. So, to be able to survive potentially significant latency associated with "waking up" the system memory 106 from the low power state just to retrieve data, the display engine 112 ensures that the display FIFO buffer 116 stores sufficient pixel data to satisfy the timing requirements of the display device 114 during the low power state. Specifically, while the computing device 100 resides in the low power state, the display engine 110 processes and drains the data in the display FIFO buffer 116 in a direction 118. When the display engine 110 hits a pre-determined critical watermark in the display FIFO buffer 116, the display engine 110 initiates the process of exiting the low power state and fetching data from the system memory 106 to fill up the display FIFO buffer 116 in a direction 120. This filling up process is also referred to as "topping off" the display FIFO buffer 116.

FIG. 1B is a timing diagram illustrating one pattern of system memory accesses by a display system without a display FIFO buffer to optimize power efficiency and a display engine, whereas FIG. 1C is a timing diagram illustrating a different pattern of system memory accesses by the display system 110 with the display FIFO buffer 116 to optimize power efficiency and the display engine 112. Without the power efficiency optimization, the gap between any two memory accesses, denoted as access gap 150, is typically less than the latency associated with entering or exiting a low power state, such as the self-refresh state. On the other hand, with an appropriated sized display FIFO buffer 116, the memory accesses can be clustered, and an access gap 160 can be lengthened to be at least equal to the latency associated with entering or exiting the self-refresh state. This clustering of memory access requests and lengthening of access gaps are collectively referred to as "display stutter." With the pattern shown in FIG. 1C, the computing device 100 is able to achieve the desired energy efficiency.

However, in addition to the display system 110, the computing device 100 has various input/output ("I/O") agents that request to access the system memory 106 via the system link 108 and a chipset 104. Some examples of these I/O agents include, without limitation, an Integrated Driver Electronics ("IDE") device, a Universal Serial Bus ("USB") device, a network controller, a Peripheral Component Interconnect Express ("PCI Express") controller, a PCI bridge, and a PCI-X controller. Each of the N I/O agents has its own distinct timing requirements, and many of the I/O agents do not support stutter requirements. Although redesigning each of the I/O agents to issue memory access requests leading to a similar memory access pattern as the one shown in FIG. 1C may improve the energy efficiency of the computing device 100, the risks and the costs of tinkering with multiple working devices, especially the legacy I/O agents that have already been widely adopted, are likely to far outweigh any such improvement.

As the foregoing illustrates, what is needed in the art is a generalized system stutter that can be easily deployed and addresses at least the shortcomings of the prior art approaches set forth above.

SUMMARY OF THE INVENTION

A method and system for implementing a generalized system stutter are disclosed. Specifically, one embodiment of the present invention sets forth a method, which includes the steps of blocking a first request received from a first of a plurality of bus masters during a low power state of a computing device for as long as permissible by the timing requirements of the computing device, wherein the first request reaching a limit of the timing requirements is capable of triggering the computing device to transition out of the low power state, and during an active state of the computing device, servicing the first request along with other pending requests from the rest of the plurality of bus masters before the computing device transitions back to the low power state.

One advantage of the disclosed method and system is that without any redesign of various I/O agents in a computing device, memory accesses for this computing device can be managed to enhance the energy efficiency of the computing device

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, one embodiment of the present invention is implemented as a software component for use with a computing device. The software component defines functions of the embodiments (including the methods described herein) and can be contained on a variety of computer-readable storage media. Illustrative computer-readable storage media include, but are not limited to: (i) non-writable storage media (e.g., read-only memory devices within a computing device) on which information is permanently stored; (ii) writable storage media (e.g., writeable memory devices such as flash memory) on which alterable information is stored. Such computer-readable storage media, when carrying computer-readable instructions that direct the functions of the present invention, are embodiments of the present invention. It should however be apparent to a person with ordinary skills in the art to implement other embodiments of the present invention using hardware components or a combination of hardware components and software components.

Figure 1A:
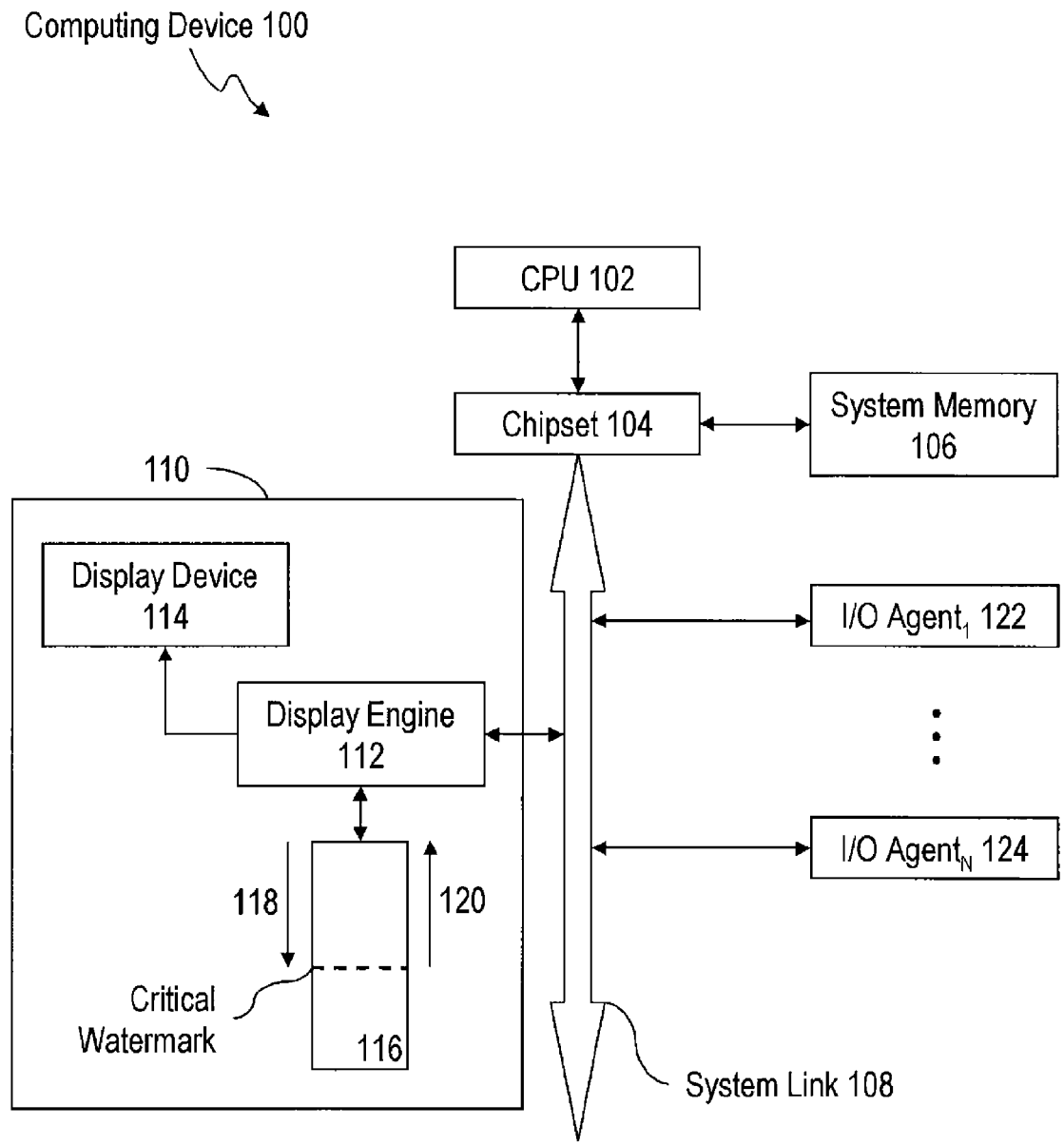
FIG. 1A is a simplified block diagram of a computing device capable of displaying data in a low power state.
Figure 1B:
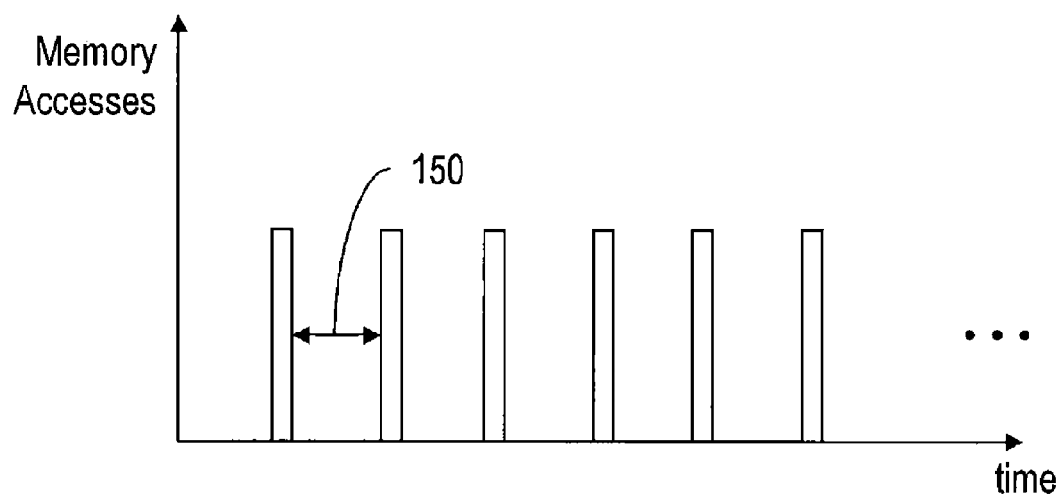
FIG. 1B is a timing diagram illustrating one pattern of system memory accesses by a display system without a display FIFO buffer.
Figure 1C:
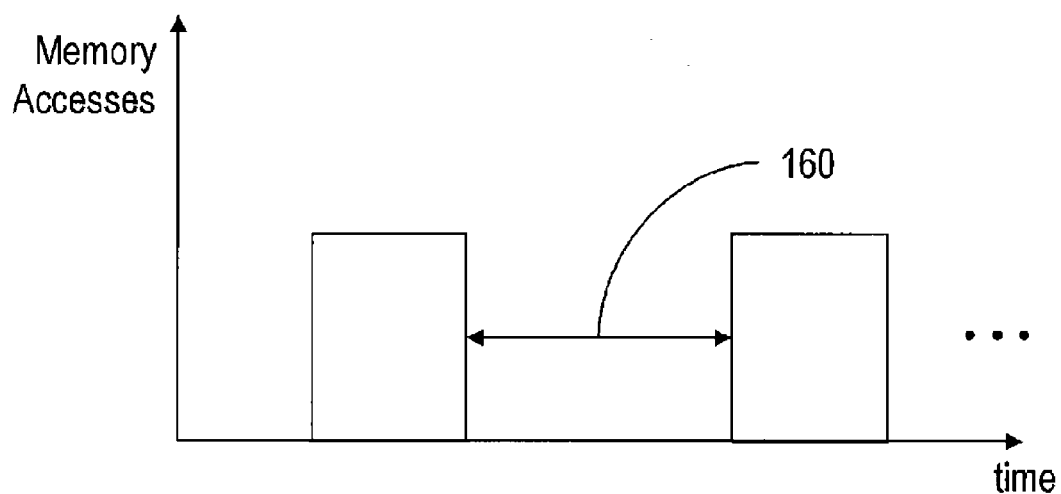
FIG. 1C is a timing diagram illustrating a different pattern of system memory accesses by another display system, which includes a display FIFO buffer.
Figure 2:
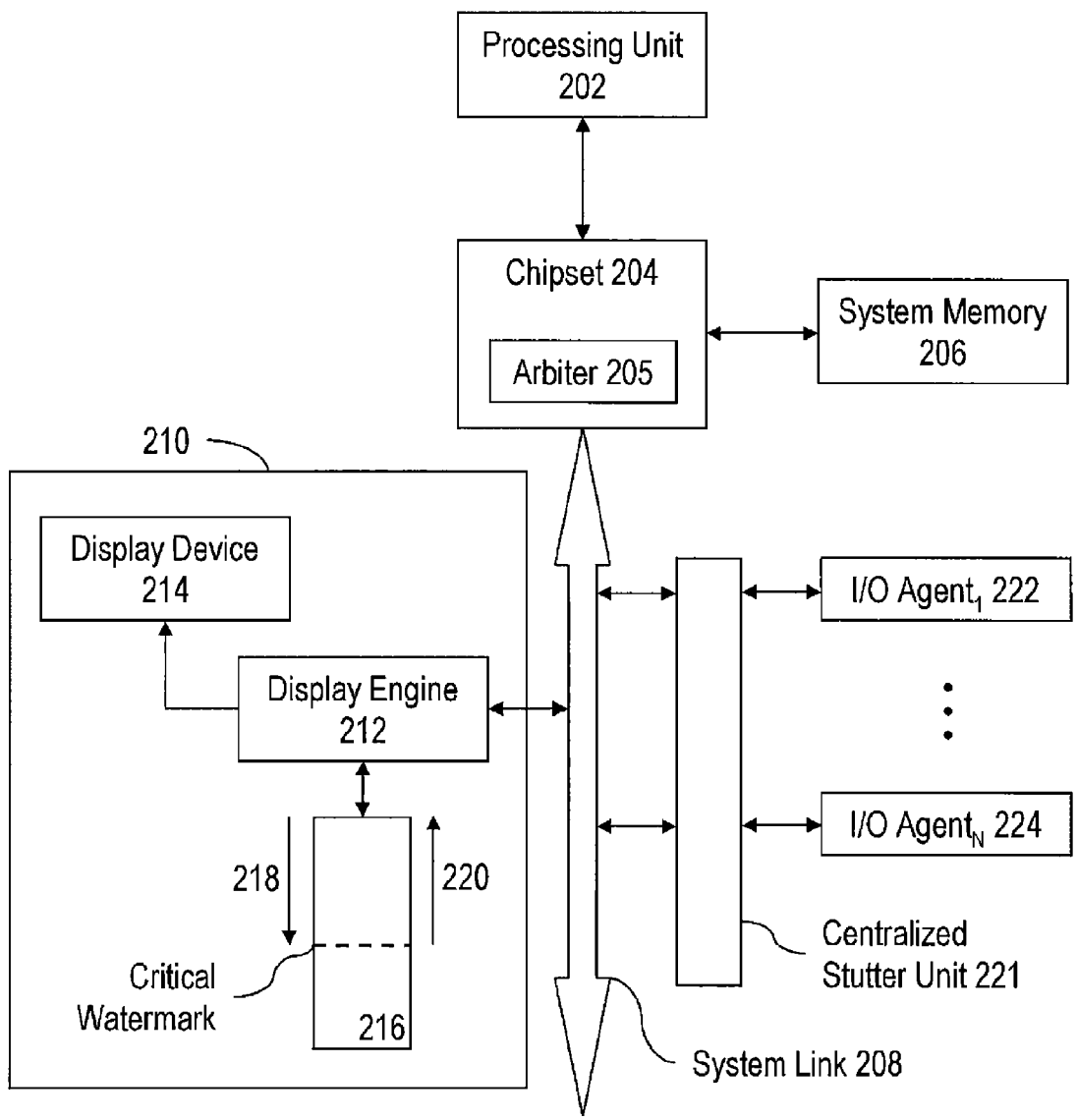
FIG. 2 is a simplified block diagram of some components in a computing device configured to implement generalized system stutter, according to one embodiment of the present invention.

FIG. 2 is a simplified block diagram of some components in a computing device 200 configured to implement generalized system stutter, according to one embodiment of the present invention. The computing device 200 includes a processing unit 202, a chipset 204 with an arbiter 205, system memory 206, a display system 210, and a centralized stutter unit 221 coupled to a system link 208 and a number of I/O agents. The display system 210 typically includes a display engine 212, local video memory (not shown in FIG. 2), and a display FIFO buffer 216 to process video data and to drive a display device 214. The display device 214 is an output device capable of emitting a visual image corresponding to a data signal generated by the display engine 212. Some examples of the display device 214 include, without limitation, a cathode ray tube (CRT) monitor, a liquid crystal display, a plasma display, a projector, or any other suitable display system.

The system memory 206 stores programming instructions and data, including screen data, for the processing unit 202 and even the display engine 212 to execute and operate on. As shown, the processing unit 202 communicates with the system memory 206 and the display system 210 via the chipset 204. Alternatively, the processing unit 202 includes a dedicated memory port to connect to the system memory 206. In other implementations, the processing unit 202, the display engine 212 in the display system 210, the chipset 204, or any combination thereof, may be integrated into a single processing unit. Further, the functionality of the display engine 212 may be included in the chipset 204 or in some other type of special purpose processing unit or co-processor. In such embodiments, software instructions may reside in other memory systems than the system memory 206 and may be executed by processing units other than the processing unit 202. It should also be apparent to a person with ordinary skills in the art to recognize that the chipset 204 may include multiple discrete integrated circuits that work together to serve different types of I/O agents, such as a northbridge and a southbridge.

Although the arbiter 205 and the centralized stutter unit 221 are shown to be two discrete components in FIG. 2, it should be apparent to a person with ordinary skills in the art to implement generalized system stutter using other configurations while remaining within the scope of the present invention. For example, in one implementation, the functionality of the centralized stutter unit 221 is included in the arbiter 205.

Figure 3A:
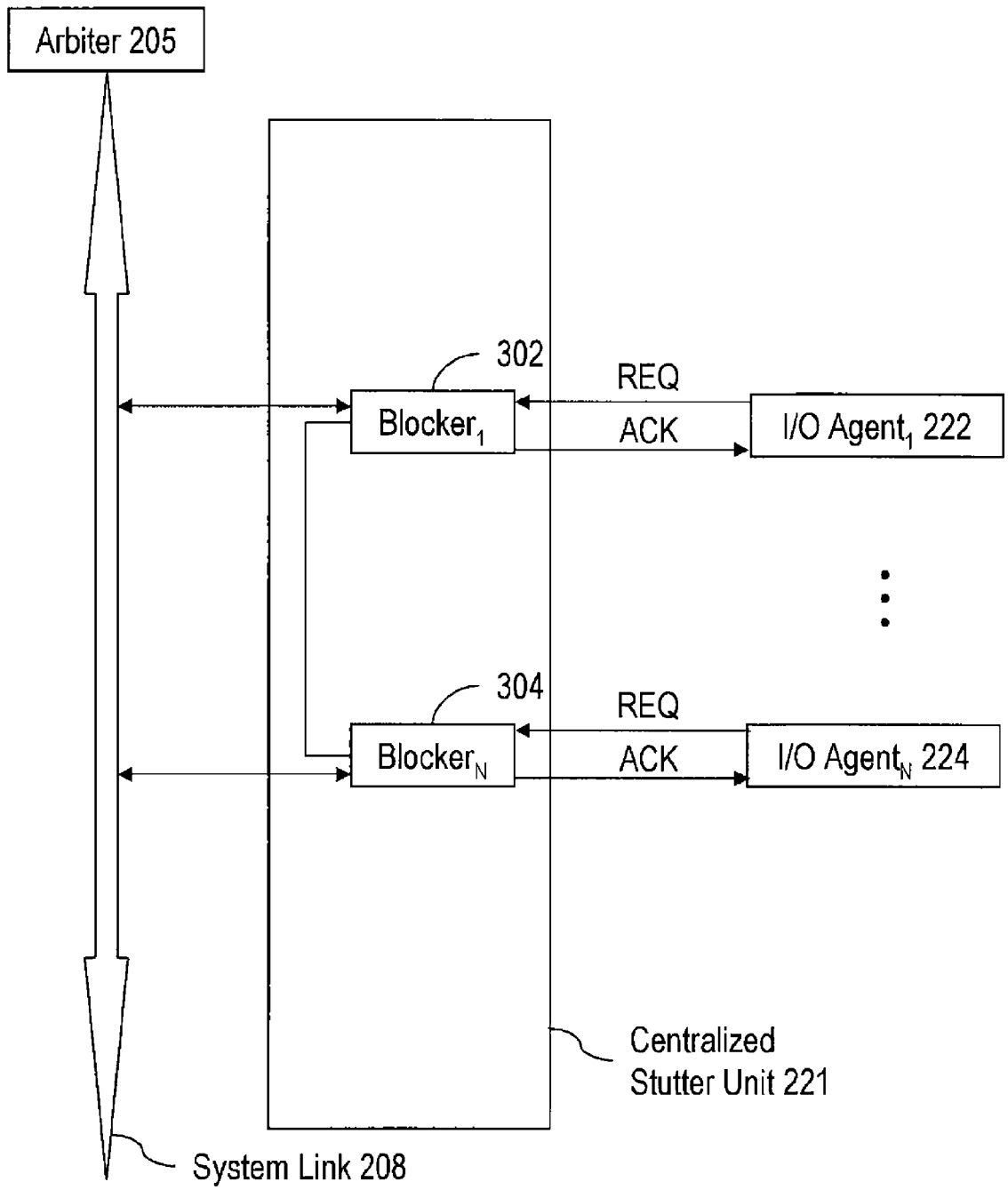
FIG. 3A is an exploded view of a centralized stutter unit, according to one embodiment of the present invention.

FIG. 3A is an exploded view of the centralized stutter unit 221, according to one embodiment of the present invention. For each I/O agent with a bus master, the centralized stutter unit 221 includes a corresponding blocker to potentially block the requests of the bus master from propagating to the arbiter 205. For instance, a blocker$_1$ 302 corresponds to an I/O agent$_1$ 222, and a blocker$_N$ 304 corresponds to an I/O agent$_N$ 224. In one implementation, each blocker has a programmable field, MAX_BLOCK_TIME, which can be expressed mathematically as follows:

MAX_BLOCK_TIME=latency tolerance associated with I/O agent−(latency associated with exiting a low power state+amount of time arbitrating among I/O agents)

To illustrate, in conjunction with FIG. 2, suppose the bus master of the I/O agent$_1$ 222 has a built-in 100 usec of latency tolerance, and the bus master requests data from the system memory 206 while in a low power state. Suppose further that it takes 20 usec for both the system memory 206 to transition from the low power state to an active state and the arbiter 205 to select a request to service. So, for the bus master of the I/O agent$_1$ 222 to meet its timing constraints, it needs to receive the requested data within 100 usec. However, since it takes 20 usec for the arbiter 205 and the system memory 206 to service the request, the blocker$_1$ 302 can at most block the request for (100-20) or 80 usec. In other words, on the 80$^{th}$ usec, the blocker$_1$ 302 needs to start propagating the request to arbiter 205 and initiate the process of transitioning the system memory 206 to the active state. Alternatively, the latency tolerance used in the above equation further depends on the type of software safety nets, if any, configured to operate on the computing device 200. For example, one software safety net configures the computing device 200 to resend packets if packet losses are detected during a transmission. With such a software safety net, the latency tolerance may be lengthened to exceed the built-in latency tolerance of the bus master.

Moreover, each blocker is connected to one another. So, the propagation of one bus master request from a single I/O agent to the arbiter 205 triggers the "unblocking" of all the other blockers in the centralized stutter unit 221 and releases all the pending bus master requests to the arbiter 205. The arbiter 205 is configured with policies to select among the requests from various bus masters to service. It should be apparent to a person with ordinary skills in the art to recognize that the arbiter 205 can adopt any of the known arbitration schemes without exceeding the scope of the present invention.

Figure 3B:
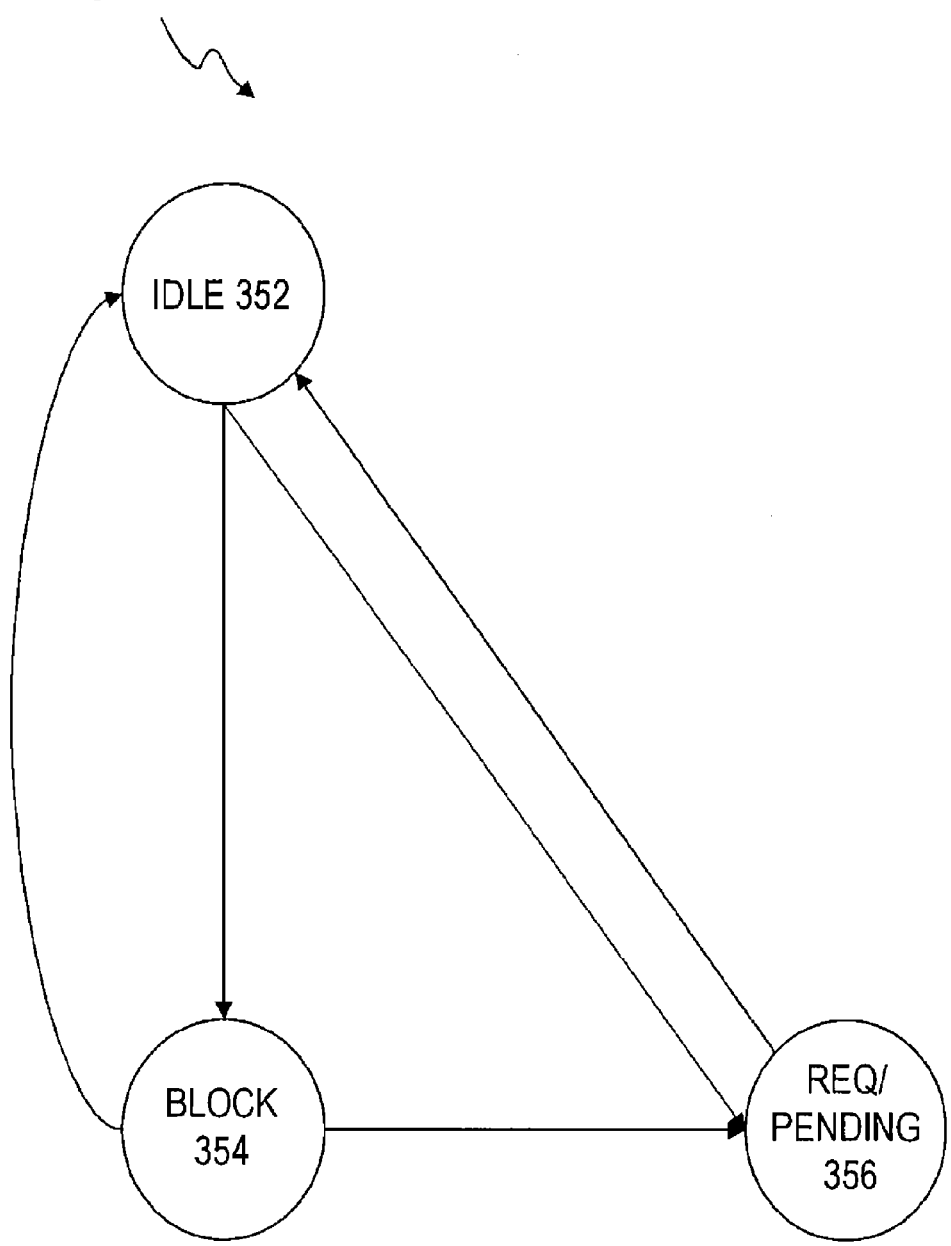
FIG. 3B is a state transition diagram of a blocker in the centralized stutter unit, according to one embodiment of the present invention.

FIG. 3B is a state transition diagram 350 of a blocker in the centralized stutter unit 221, according to one embodiment of the present invention. Using the blocker$_1$ 302 shown in FIG. 3A as an illustration, the blocker$_1$ 302 typically stays in an idle state 352, especially during a low power state of the computing device 200 of FIG. 2. This state indicates that the blocker$_1$ 302 does not have any pending bus master request. Suppose during the low power state, the blocker$_1$ 302 receives a bus master request from the I/O agent$_1$ 222. If the aforementioned MAX_BLOCK_TIME for the blocker$_1$ 302 contains a non-zero value, then the blocker$_1$ 302 transitions to a block state 354 and starts blocking the request. The block remains in effective until either the I/O agent$_1$ 222 deasserts the request or the blocker$_1$ 302 transitions to a request pending state 356. To transition to the request pending state 356, one triggering condition is when the bus master request has already been blocked for MAX_BLOCK_TIME, and another triggering condition is when the computing device 200 exits the low power state. This transitioning out of the low power state can occur prior to the expiration of MAX_BLOCK_TIME in a number of scenarios. For instance, another blocker in the centralized stutter unit 221 unblocks its pending request before the blocker$_1$ 302 reaches its MAX_BLOCK_TIME and triggers the computing device 200 to enter an active state. In another scenario, the display system 210 begins requesting for data via the system link 208 and triggers the computing device 200 to transition out of the low power state before the expiration of MAX_BLOCK_TIME of the blocker$_1$ 302.

Instead of reaching the request pending state 356 via the block state 354 as described above, the blocker$_1$ 302 may reach the request pending state 356 directly from the idle state 352. To illustrate, suppose the blocker$_1$ 302 again receives a bus master request from the I/O agent$_1$ 222. If the computing device 200 is not in a low power state or MAX_BLOCK_TIME of the blocker$_1$ 302 is configured to be zero, then the blocker$_1$ 302 directly transitions to the request pending state 356. After propagating the pending request to the arbiter 205 for further processing, the blocker$_1$ 302 transitions back to the idle state 352.

Furthermore, because the display system 210 is typically the main consumer of data during a low power state of the computing device 200 of FIG. 2, one implementation of the generalized system stutter is to manipulate the aforementioned blockers to cluster as many memory access requests from various I/O agents with the memory access requests from the display system 210 as possible. FIG. 4A to FIG. 4E and the following discussions describe the handling of various bus masters of I/O agents with different latency tolerance limits.

Figure 4A:
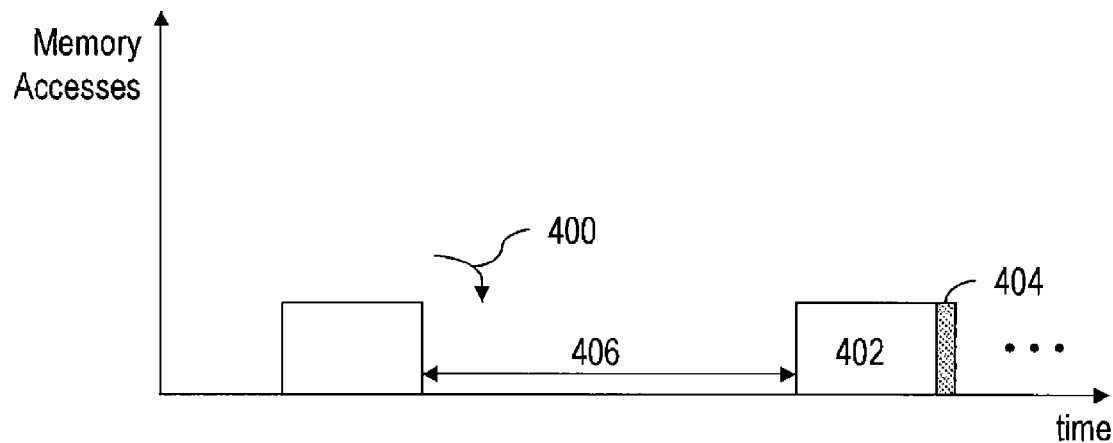
FIG. 4A is a timing diagram of handling a memory access request from a bus master having a high latency tolerance, according to one embodiment of the present invention.

FIG. 4A is a timing diagram of handling a memory access request 400 from a bus master having a high latency tolerance, according to one embodiment of the present invention. Here, the blocker responsible for this bus master causes the memory access request 400 to be serviced after a cluster 402 of memory accesses for the display system 210 is performed. In one implementation, the cluster 402 of memory accesses is for the display engine 212 to fill up the display FIFO 216. By grouping a memory access 404 with the cluster 402, the system memory 206 does not need to separately transition out of the low power state to just satisfy the memory access request 400. It is worth noting that an access gap 406 is limited by the minimum latency tolerance among all the I/O agents in the computing device with pending requests to access the system memory 206. In the example shown in FIG. 4A, however, the minimum latency tolerance equals to the latency tolerance of the display system 210, which in one implementation, is dictated by the size of the display FIFO 216.

Figure 4B:
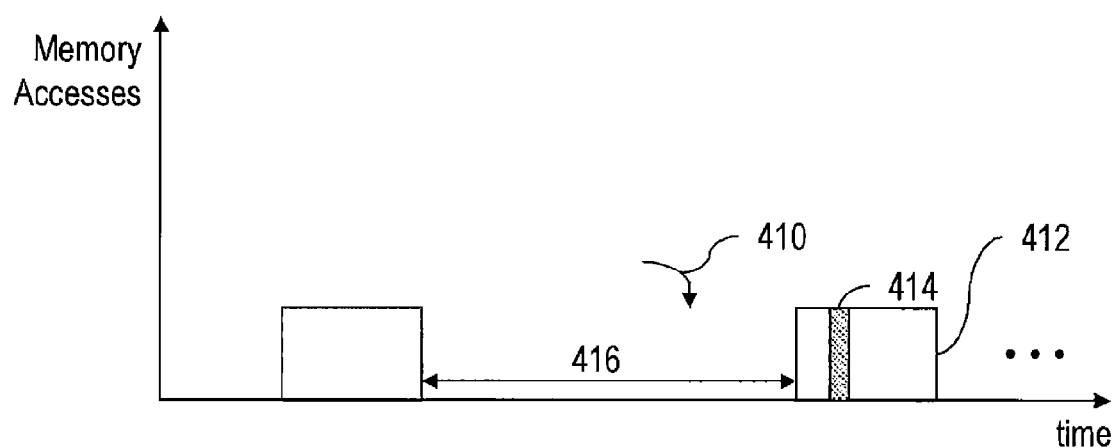
FIG. 4B is a timing diagram of handling a memory access request from a bus master having a significantly lower latency tolerance than an access gap, according to one embodiment of the present invention.

FIG. 4B is a timing diagram of handling a memory access request 410 from a bus master having a significantly lower latency tolerance than an access gap 416, according to one embodiment of the present invention. The blocker responsible for this bus master causes the unblocking of the arbiter 205 and the transitioning of the system memory 206 out of the low power state. In this specific example, a memory access 414 corresponding to the memory access request 410 is injected in a cluster 412 of memory accesses for the display system 210. Similar to the process illustrated in FIG. 4A and detailed above, processing the memory access 414 along with the cluster 412 prevents the system memory 206 from separately transitioning out of the low power state just to service the memory access request 410.

Figure 4C:
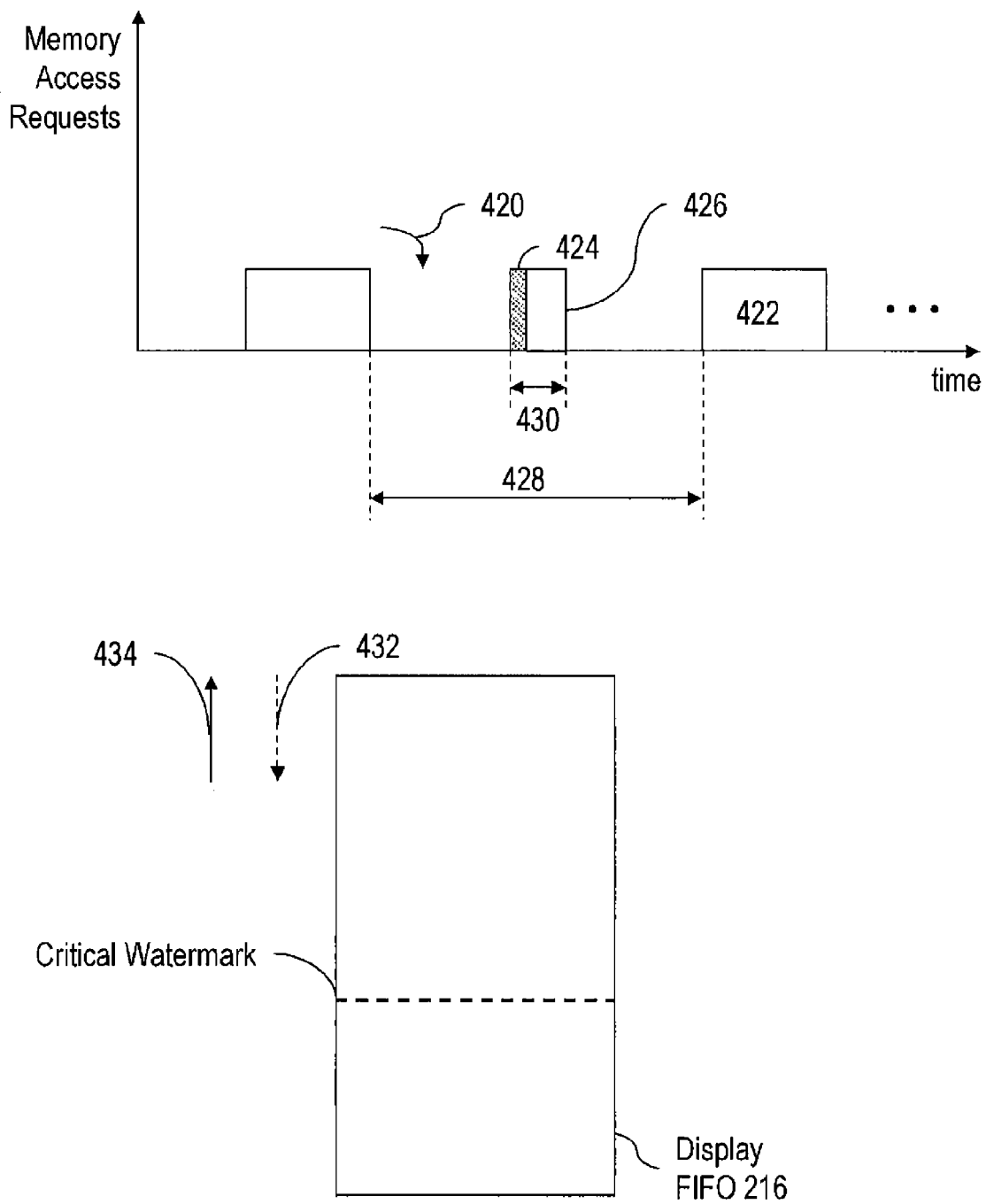
FIG. 4C is another timing diagram of handling a memory access request from a bus master having a significantly lower latency tolerance than an access gap, according to one embodiment of the present invention.

FIG. 4C is another timing diagram of handling a memory access request 420 from a bus master having a significantly lower latency tolerance than an access gap 428 Here, because of the low latency tolerance, the system memory 206 transitions out of the lower power state to service a memory access 424 corresponding to the memory access request 420. To take full advantage of the system memory 206 being in an active state during a period 430, one implementation of the display engine 212 causes the display FIFO 216 to top off in a direction 434. More precisely, as the display engine 212 drains and processes pixel data in the display FIFO 216 in a direction 432 during the low power state, the occurrence of the memory access request 420 triggers the waking up of the system memory 206 and the servicing of a cluster 426 of memory accesses to top off the display FIFO 216 in the direction 434.

Figure 4D:
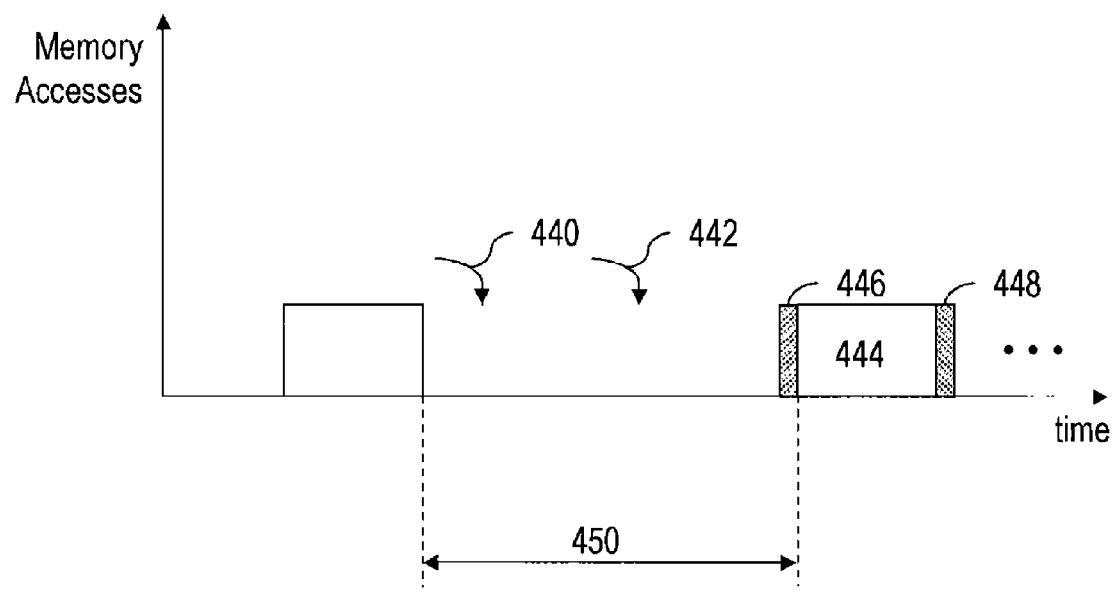
FIG. 4D is a timing diagram of handling multiple memory access requests from different bus masters, according to one embodiment of the present invention.

FIG. 4D is a timing diagram of handling multiple memory access requests from different bus masters, according to one embodiment of the present invention. Suppose the latency tolerance of either of the two bus masters is significantly longer than an access gap 450. The two blockers responsible for a memory access request 440 and a memory access request 442 cause the corresponding memory accesses 446 and 448, respectively, to be grouped with a cluster 444 of memory accesses for the display system 210. It should be apparent to a person with ordinary skills in the art to recognize that the clustering of the memory accesses 446 and 448 shown in FIG. 4D is for illustrative purposes only and can be modified according to the arbitration policies adopted by the arbiter 205 without exceeding the scope of the present invention.

Figure 4E:
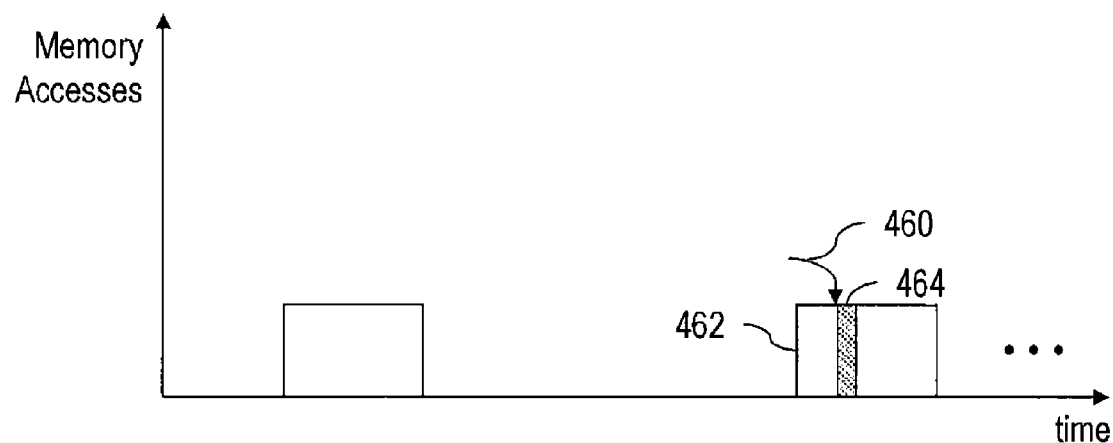
FIG. 4E is a timing diagram of handling a memory access request from a bus master during the processing of a cluster of memory accesses for a display system, according to one embodiment of the present invention.

Lastly, FIG. 4E is a timing diagram of handling a memory access request 460 from a bus master during the processing of a cluster 462 of memory accesses for the display system 210, according to one embodiment of the present invention. In one implementation, the blocker responsible for this bus master propagates the request to the arbiter 205 without further blocking and causes a memory access 464 to be injected in a cluster 462 of memory accesses for the display system 210.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A method for implementing a generalized system stutter, the method comprising:

blocking a first request received from a first bus master of a plurality of bus masters during a low power state of a computing device until a maximum blocking time passes, a pending memory access received request from at least one of the rest of the plurality of bus masters is serviced or a display device requests data via a system link, wherein the first request is capable of triggering the computing device to transition out of the low power state; and during an active state of the computing device, servicing the first request along with other pending requests from the rest of the plurality of bus masters before the computing device transitions back to the low power state.

2. The method of claim 1, further comprising unblocking the first request for the computing device to enter the active state after the expiration of a period of time equaling to a minimum latency tolerance among all of the plurality of bus masters having a pending request.

3. The method of claim 2, wherein the minimum latency tolerance further takes into account an aggregated amount of time to exit the low power state and to arbitrate among the first request and the other pending requests.

4. The method of claim 3, wherein the minimum latency tolerance is lengthened by a safety net mechanism supported by the computing device.

5. The method of claim 1, further comprising:
processing pixel data in a display buffer during the low power state of the computing device; and
filling up the display buffer during the active state of the computing device.

6. The method of claim 1, wherein the servicing step further comprises arbitrating among the first request and the other pending requests to determine a service sequence.

7. The method of claim 1, wherein the servicing step further comprising:
upon receipt of a second request from a second of the plurality of bus masters during the active state of the computing device, servicing the second request during the active state.

8. A computing device configured to support generalized system stutter, the computing device comprising:
a processing unit,
an arbiter;
a system memory; and
a centralized stutter unit coupled to a plurality of bus masters of input/output ("I/O") agents, wherein:
a first blocker in the centralized stutter unit is configured to block a first memory access request received from a first bus master of the plurality of bus masters during a low power state of the computing device until at least one of: a maximum blocking time passes, a pending memory access received request from at least one of the rest of the plurality of bus masters is serviced or a display device requests data via a system link, wherein the first memory access request is capable of triggering the computing device to transition out of the low power state; and
during an active state of the computing device, the system memory is configured to service the first memory access request along with other pending memory access requests from the rest of the plurality of bus masters before the computing device transitions back to the low power state.

9. The computing device of claim 8, wherein each blocker in the centralized stutter unit is configured with a programmable period of blocking time.

10. The computing device of claim 8, wherein each blocker in the centralized stutter unit is connected to one another.

11. The computing device of claim 9, wherein the first blocker unblocks and sends the first memory access request to the arbiter for the computing device to enter the active state after the expiration of a minimum latency tolerance among all of the plurality of bus masters having a pending request.

12. The computing device of claim 9, wherein the programmable period of blocking time further takes into account an aggregated amount of time to exit the low power state and to arbitrate among the first memory access request and the other pending memory access requests.

13. The computing device of claim 11, wherein the computing device is configured to support a safety net mechanism to lengthen the minimum latency tolerance.

14. The computing device of claim 8, further comprising a display engine, wherein the display engine is configured to:
process pixel data in a display buffer during the low power state of the computing device; and
fill up the display buffer during the active state of the computing device.

15. The computing device of claim 8, wherein the arbiter includes a policy to arbitrate among the first memory access request and the other pending memory access requests to determine a service sequence.

16. The computing device of claim 8, wherein after a second blocker in the centralized stutter unit receives a second request from a second of the plurality of bus masters during the active state of the computing device, the system memory is configured to service the second request also during the active state.

17. A non-transitory computer-readable medium containing a sequence of instructions, which when executed by a computing device, causes the computing device to:
block a first request received from a first bus master of a plurality of bus masters during a low power state of a computing device until a maximum blocking time passes, a pending memory access received request from at least one of the rest of the plurality of bus masters is serviced or a display device requests data via a system link, wherein the first request is capable of triggering the computing device to transition out of the low power state; and
during an active state of the computing device, servicing the first request along with other pending requests from the rest of the plurality of bus masters before the computing device transitions back to the low power state.

18. The computer-readable medium of claim 17, further containing a sequence of instructions, which when executed by the computing device, causes the computing device to unblock the first request for the computing device to enter the active state after the expiration of a period of time equaling to a minimum latency tolerance among all of the plurality of bus masters having a pending request.

19. The computer-readable medium of claim 17, further containing a sequence of instructions, which when executed by the computing device, causes the computing device to:
process pixel data in a display buffer during the low power state of the computing device; and
fill up the display buffer during the active state of the computing device.

20. The computer-readable medium of claim 17, further containing a sequence of instructions, which when executed by the computing device, causes the computing device to arbitrate among the first request and the other pending requests to determine a service sequence.

* * * * *